Figure 1:
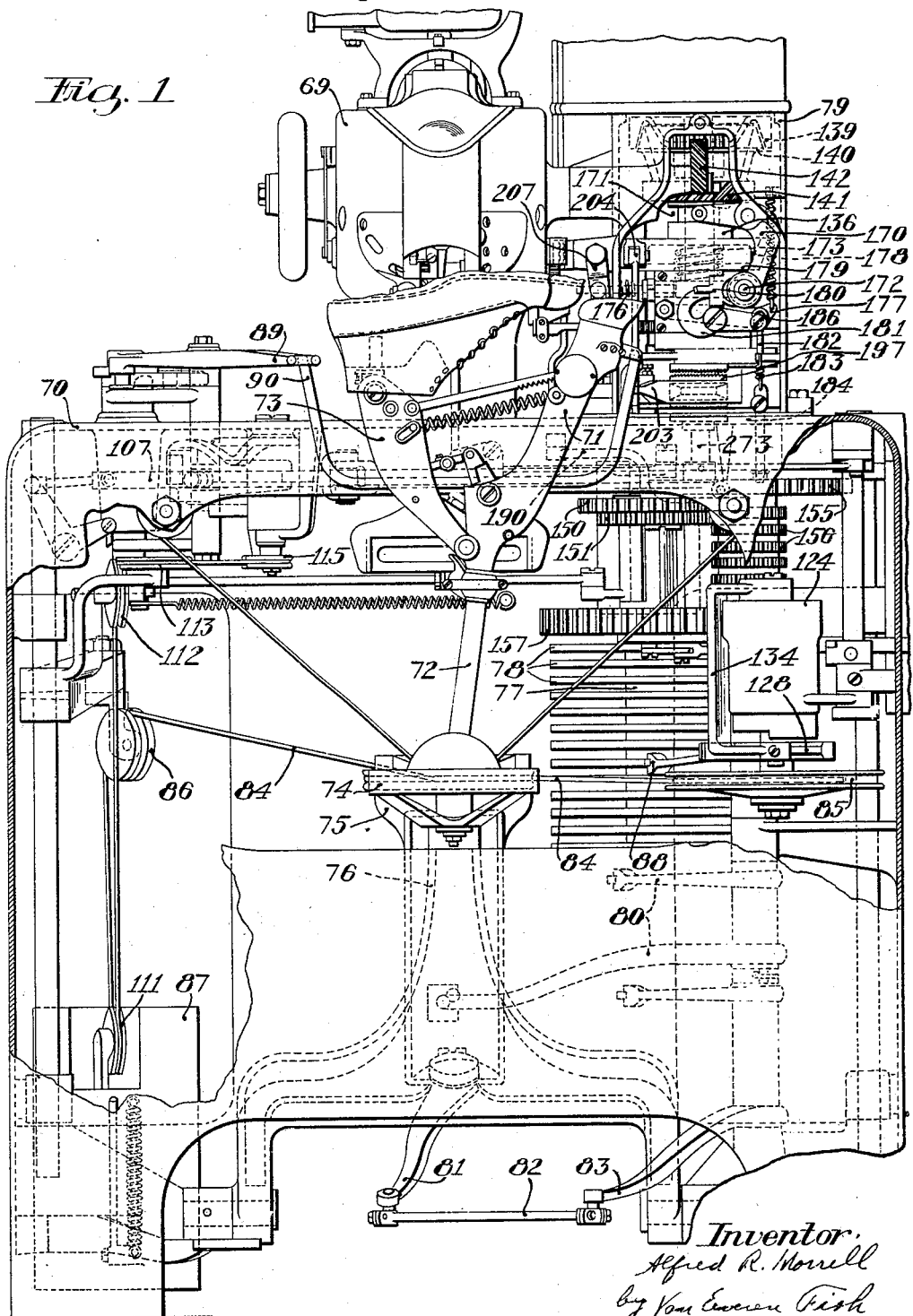

Dec. 1, 1931.  A. R. MORRILL  1,834,471
SHOE MACHINE
Original Filed June 8, 1926   14 Sheets-Sheet 4

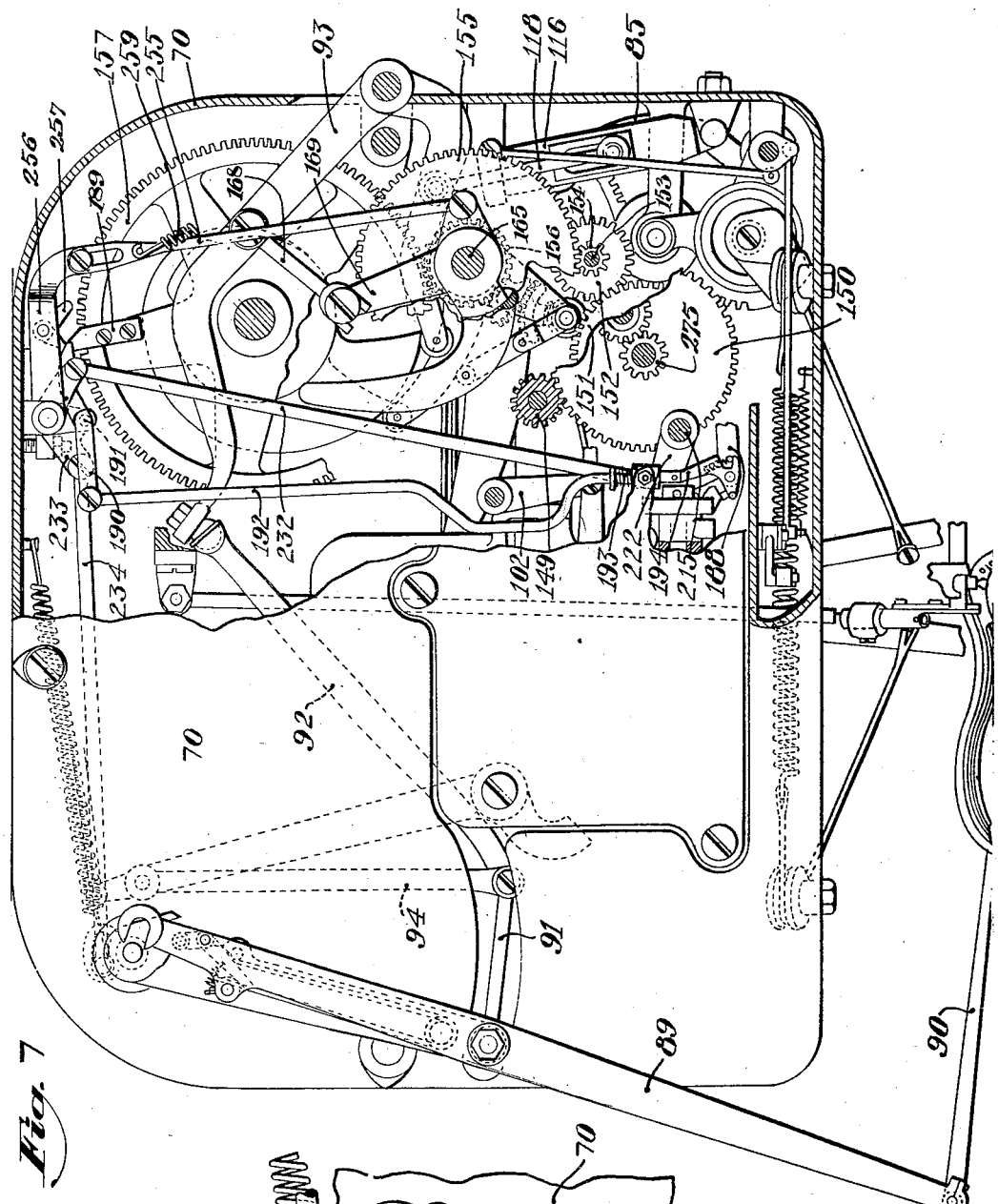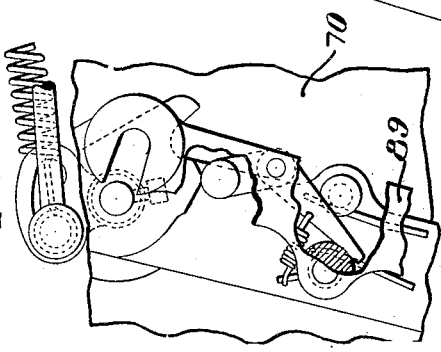

Dec. 1, 1931.   A. R. MORRILL   1,834,471
SHOE MACHINE
Original Filed June 8, 1926   14 Sheets-Sheet 7
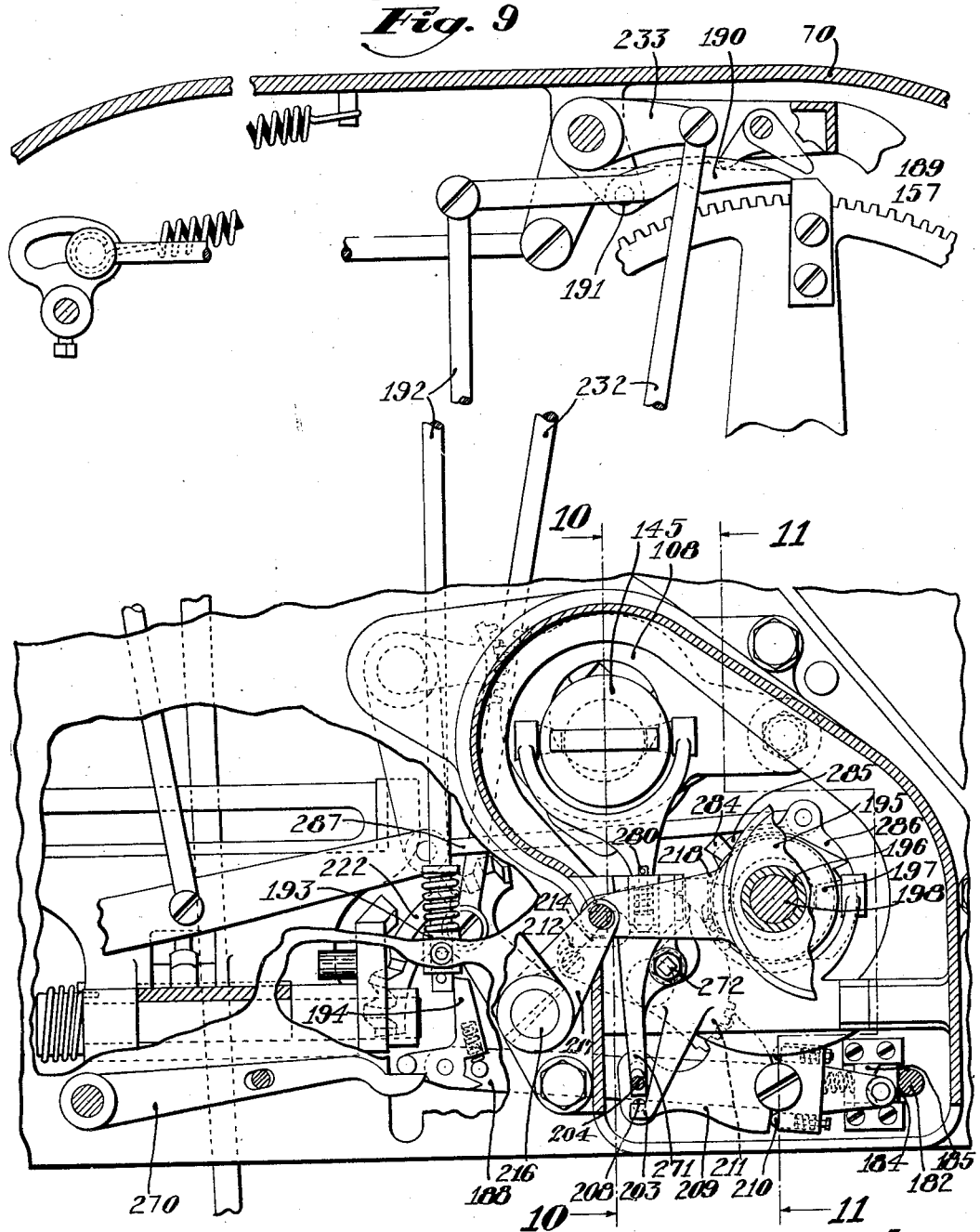

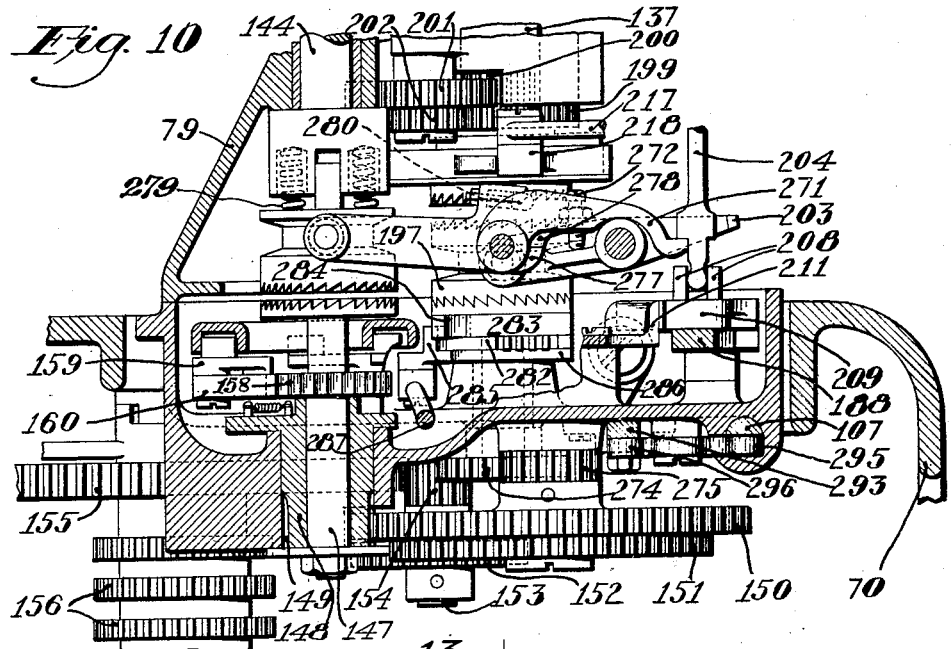
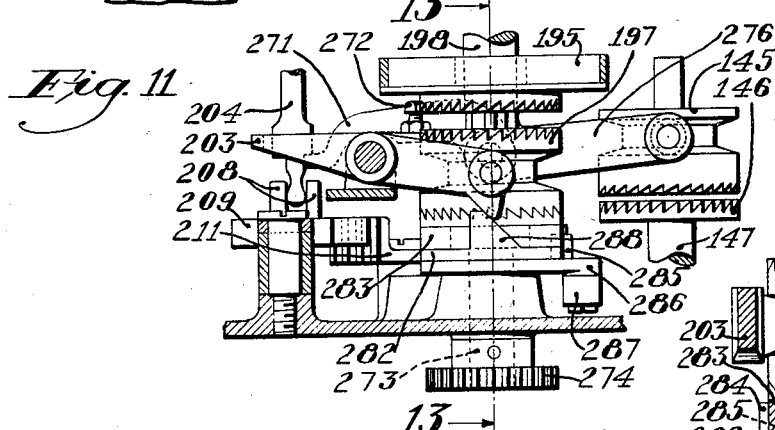
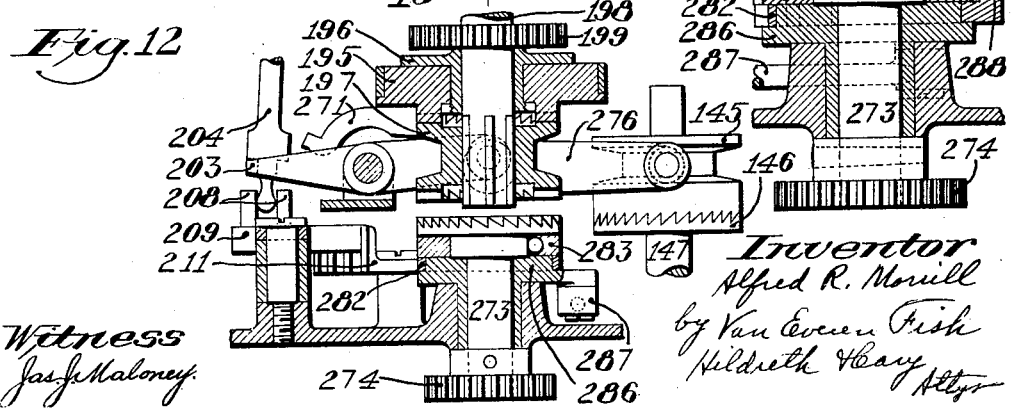

Dec. 1, 1931.  A. R. MORRILL  1,834,471
SHOE MACHINE
Original Filed June 8, 1926  14 Sheets-Sheet 9
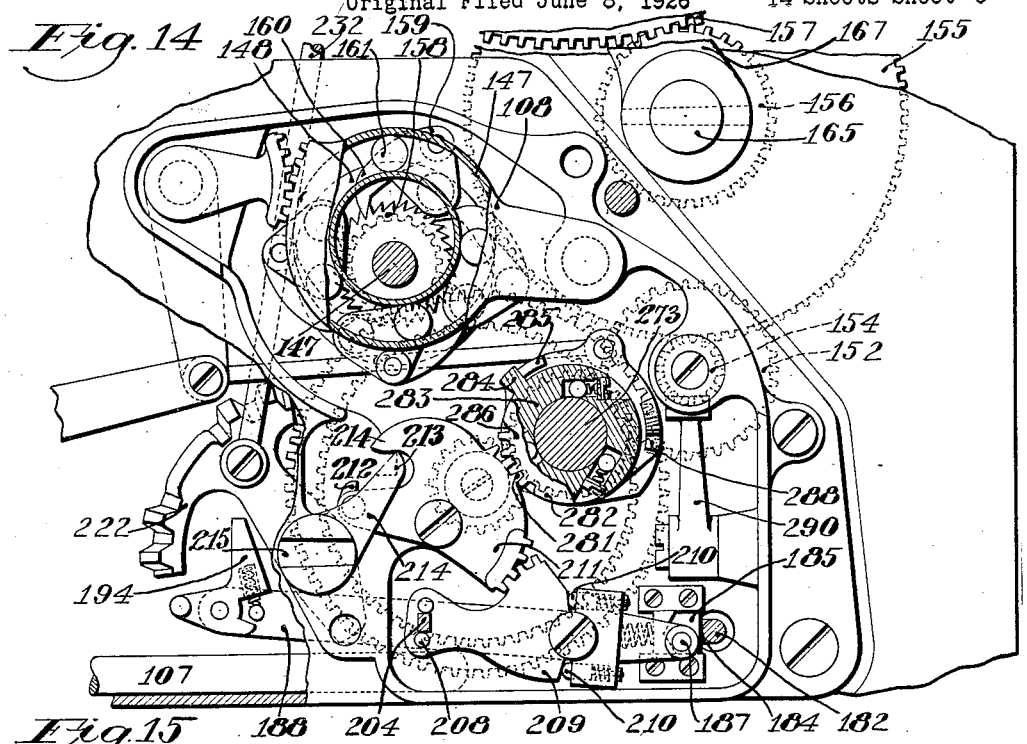
Fig. 14
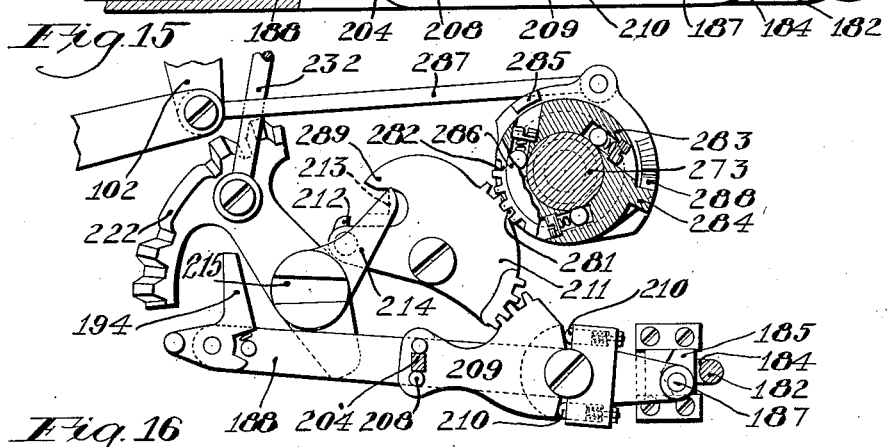
Fig. 15
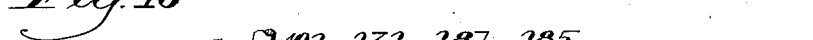
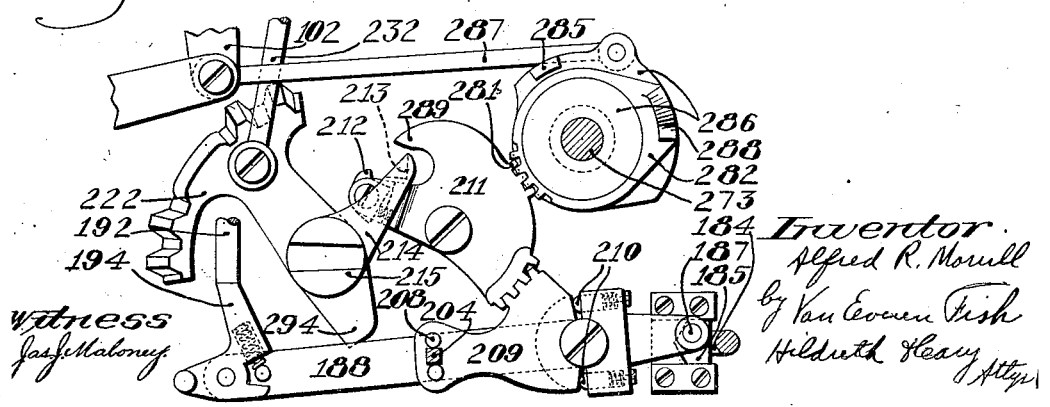
Fig. 16
Witness
Jas. J. Maloney
Inventor
Alfred R. Morrill
by Van Everen Fish
Hildreth Heavy
Attys Dec. 1, 1931.   A. R. MORRILL   1,834,471
SHOE MACHINE
Original Filed June 8, 1926   14 Sheets-Sheet 10
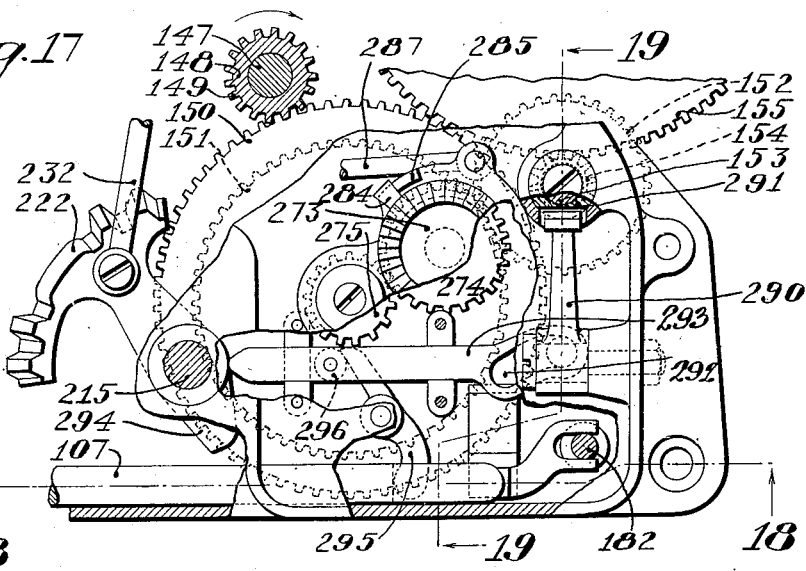
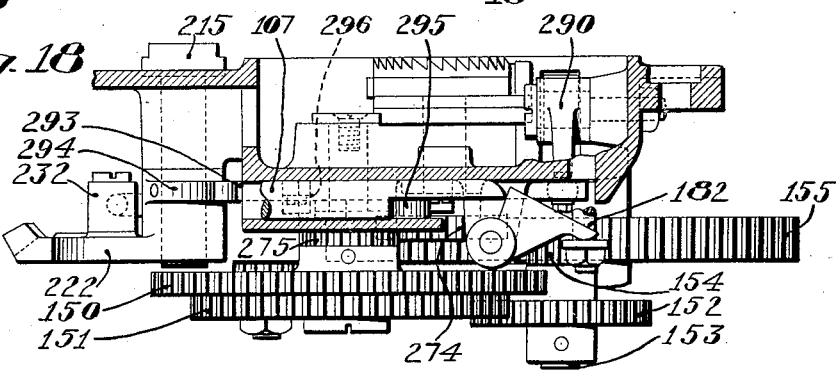
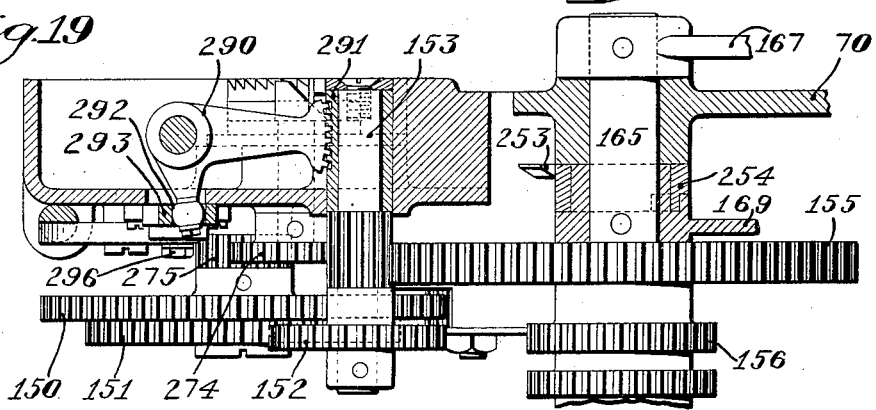

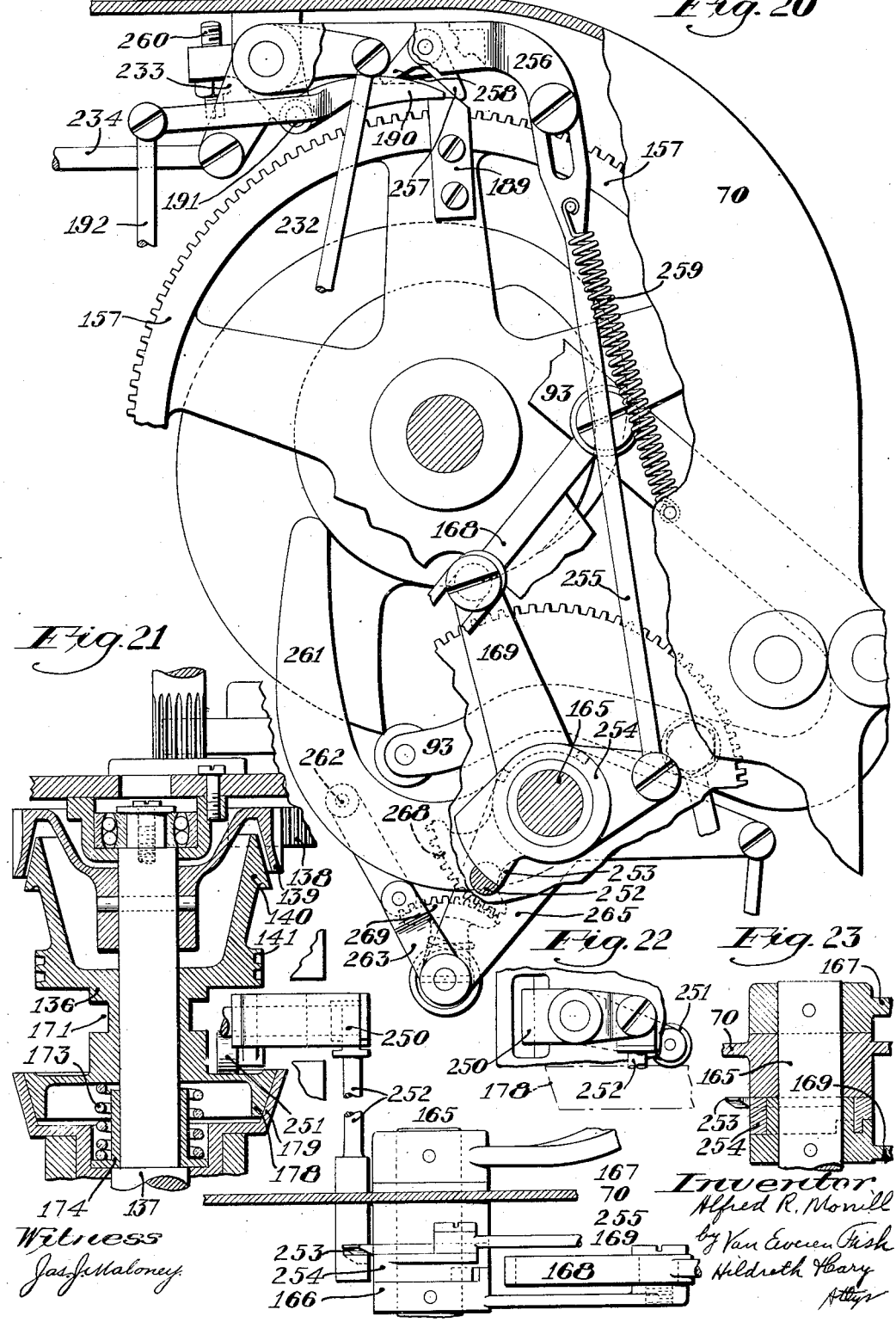

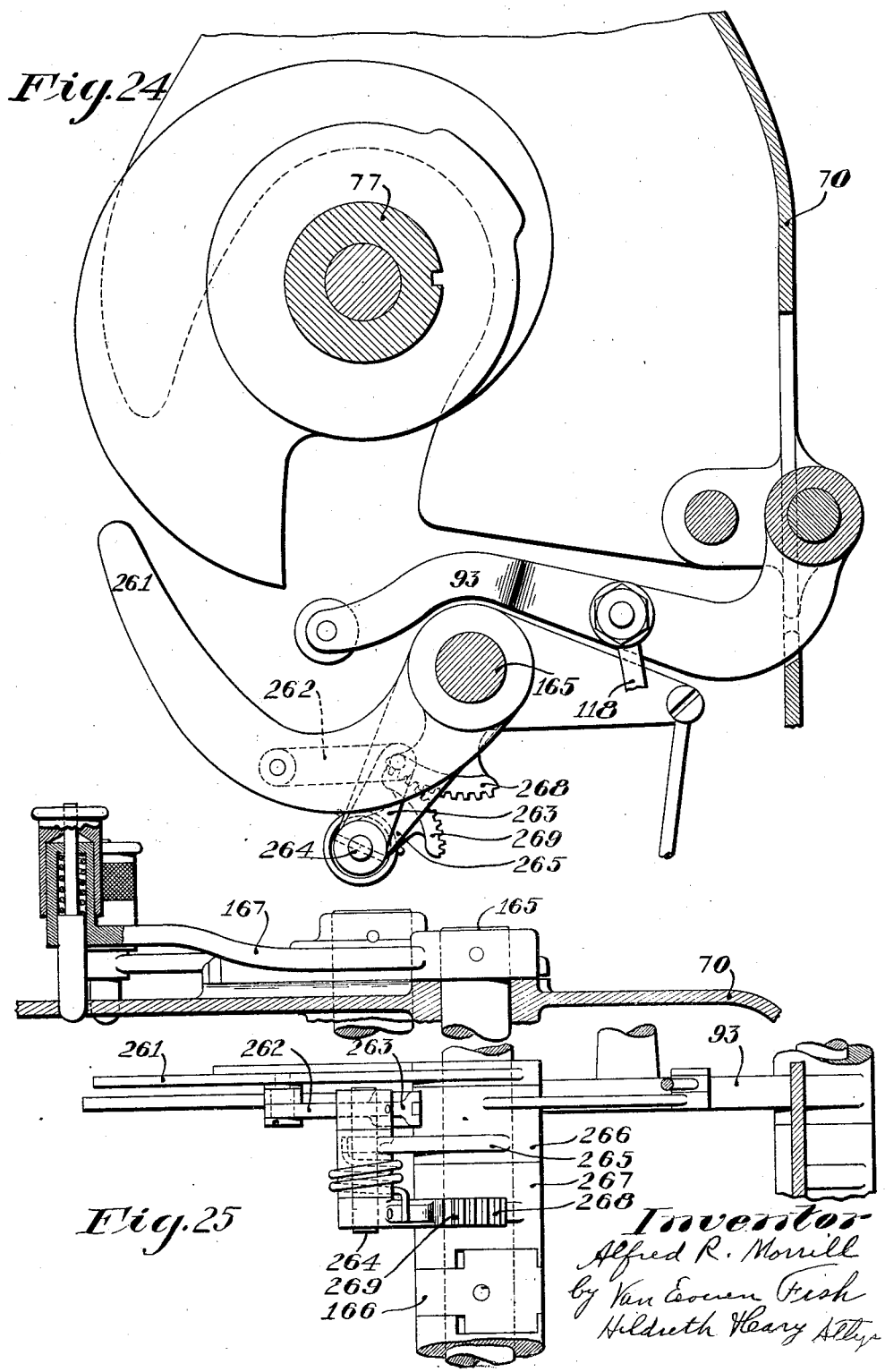

Dec. 1, 1931. A. R. MORRILL 1,834,471
SHOE MACHINE
Original Filed June 8, 1926 14 Sheets-Sheet 13
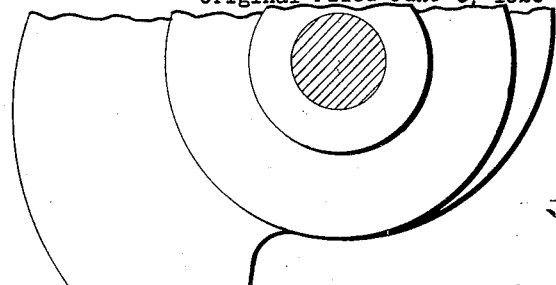
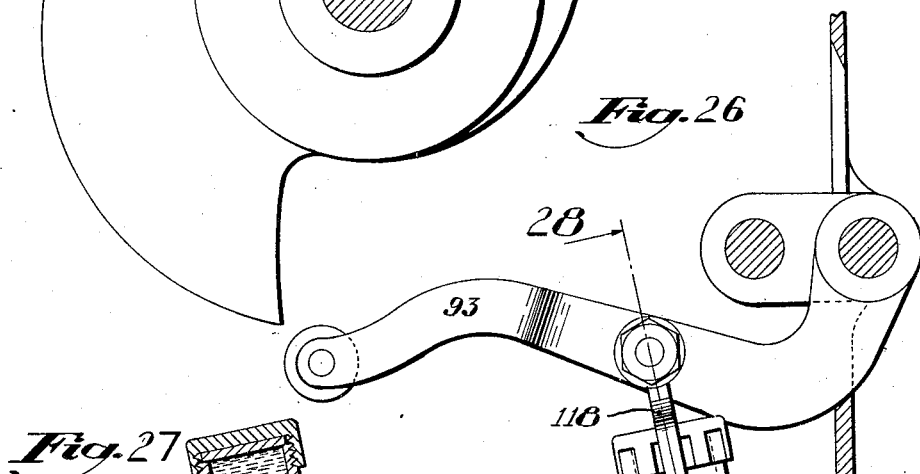
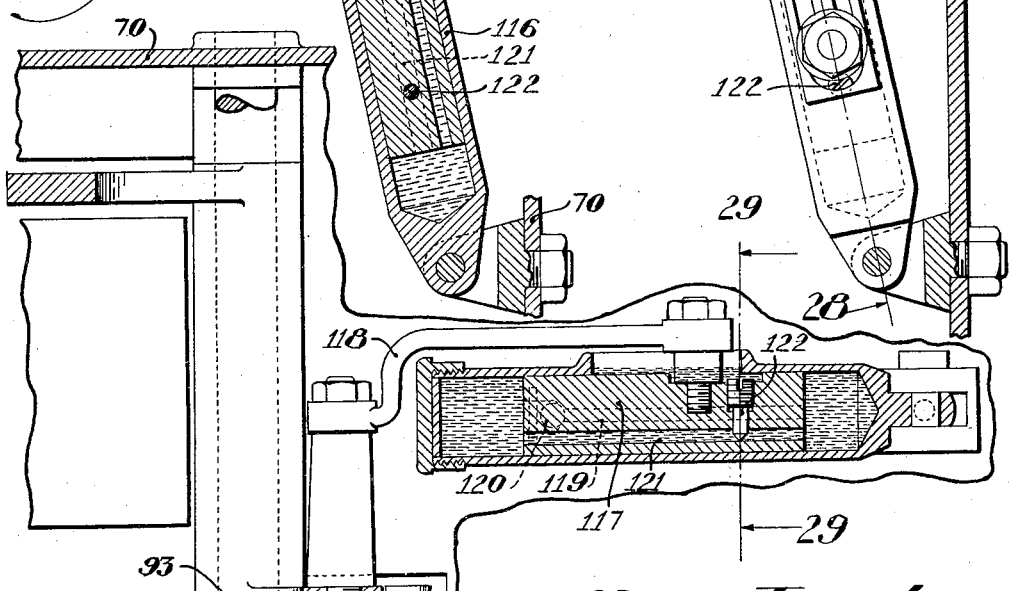
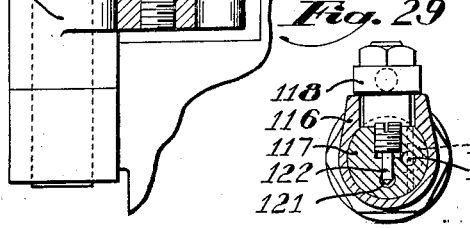

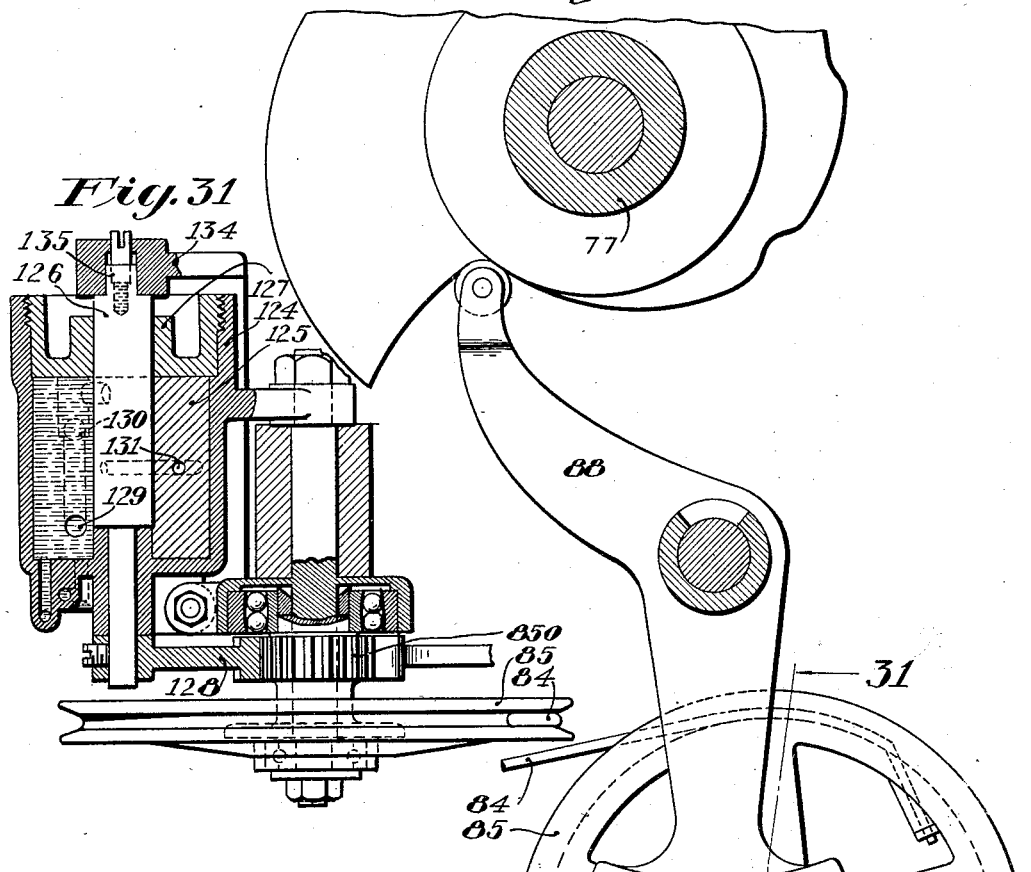
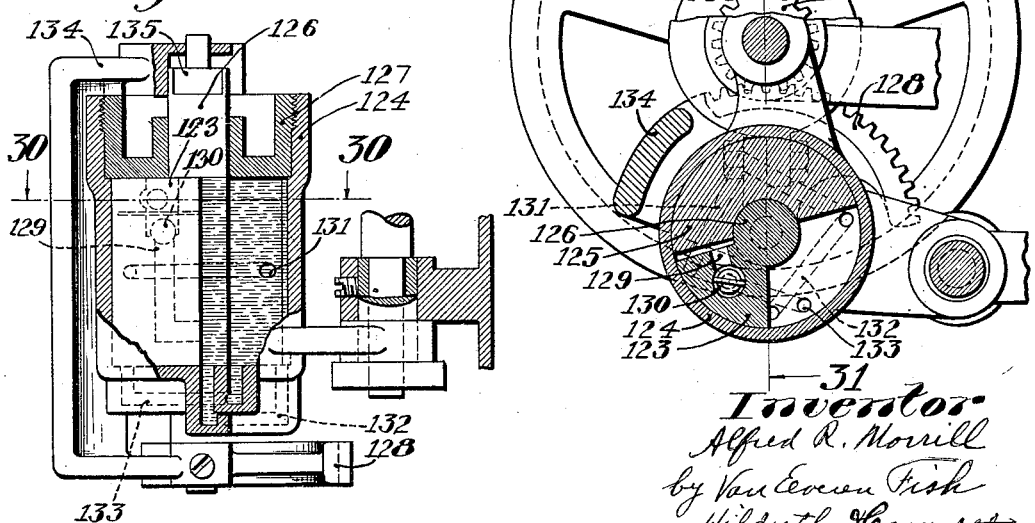

Patented Dec. 1, 1931

1,834,471

UNITED STATES PATENT OFFICE

ALFRED R. MORRILL, OF BEVERLY, MASSACHUSETTS, ASSIGNOR TO UNITED SHOE MACHINERY CORPORATION, OF PATERSON, NEW JERSEY, A CORPORATION OF NEW JERSEY

SHOE MACHINE

Original application filed June 8, 1926, Serial No. 114,441. Divided and this application filed April 26, 1929, Serial No. 358,342. Renewed April 24, 1931.

The present invention relates to shoe machines and is herein shown as embodied in a machine for operating on shoes of the type in which the shoe is supported upon a jack and in which the jack and the means for operating on the shoe are moved relatively to transfer the point of operation about the shoe, and to change the relative positions of the shoe and the operating means to cause the shoe to be presented properly to the operating means as the point of operation is transferred about the shoe, all of the relative movements of the shoe and the operating means being produced and controlled by automatically acting mechanisms. While the several features of the present invention are particularly applicable to automatic shoe machines of the type above referred to, certain features of the invention are also capable of use in other types of automatic machines or in machines in which the shoe is held in position by the operator. It is also to be understood that except as defined in the claims, the several features of the invention are not limited to any particular construction or arrangement of parts.

The machine herein disclosed as embodying the several features of the present invention and more specifically described in the inventor's pending application Serial No. 114,441, filed June 8, 1926, of which the present application is a division, is an automatic machine for sewing the welt and upper to the insole of a welted shoe and in many respects is similar in the construction and arrangement of its various parts to the automatic welt sewing machine disclosed in the patent of the present applicant and Laurence E. Topham, No. 1,616,714, dated February 8, 1927. The several features of the present invention will be readily understood by those skilled in the art from the following description, but it may be stated at this point that they relate generally to certain improved constructions and arrangements of parts for rendering more certain and reliable the operation of the mechanisms which automatically produce or control the changes in the relative positions of the shoe and the operating means.

Figure 2:
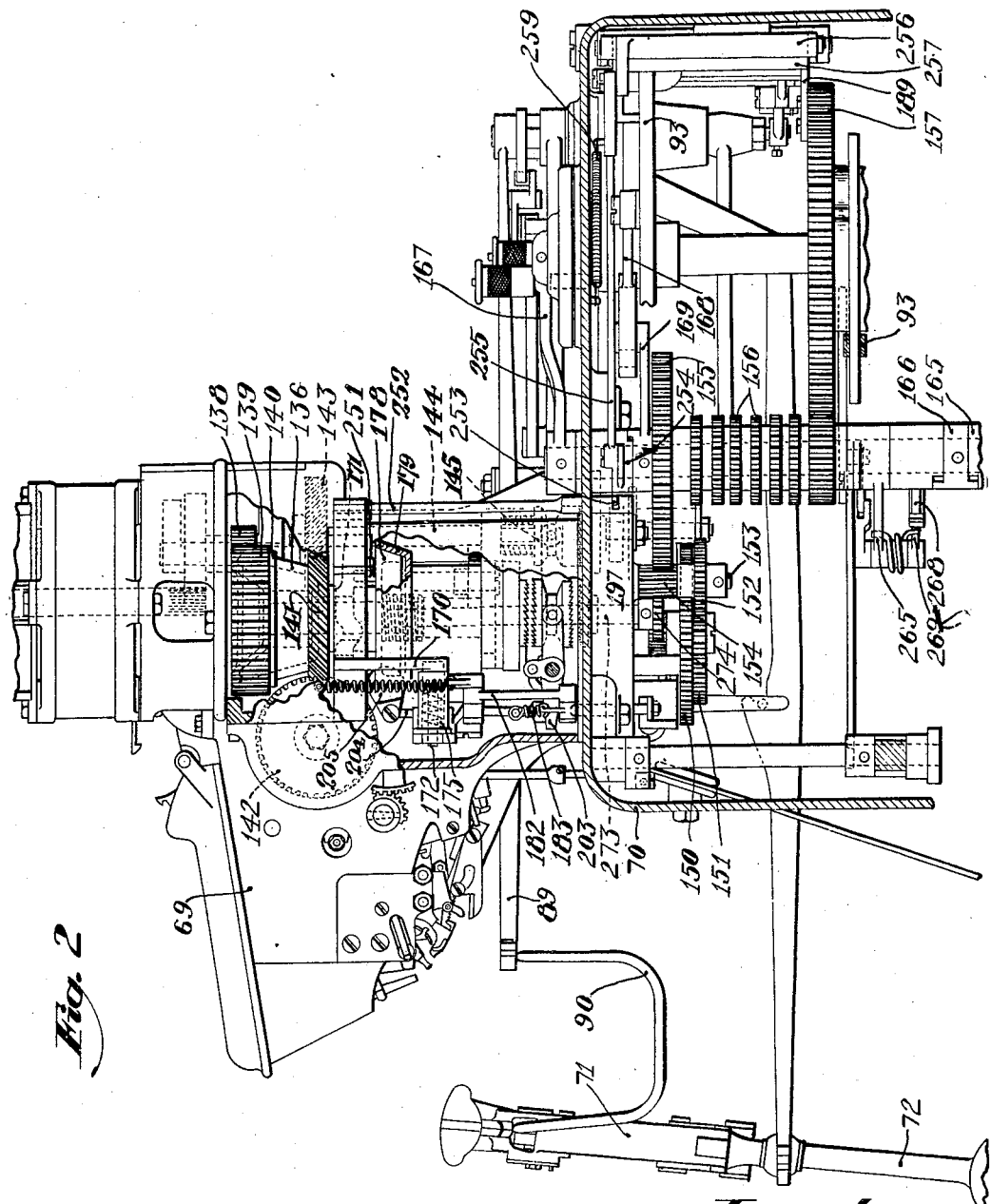
Figure 3:
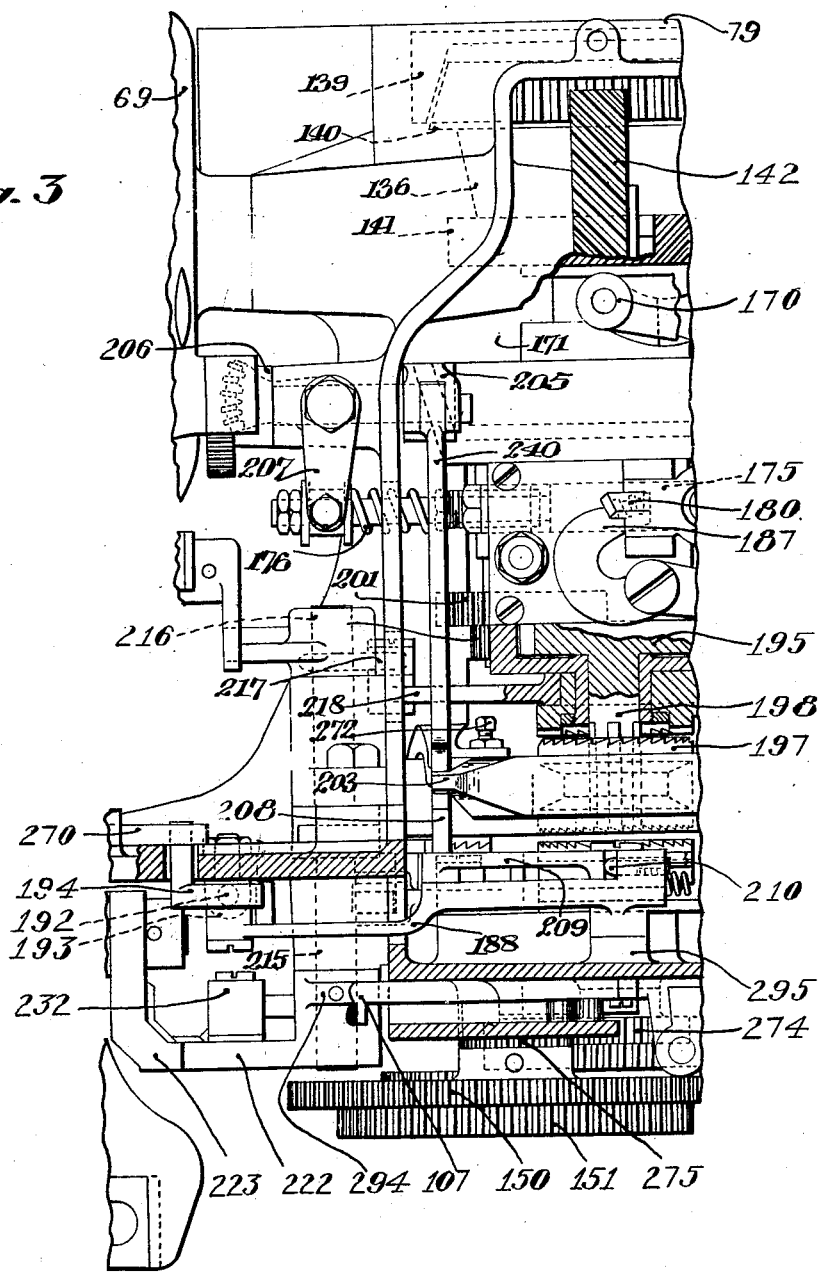
Figure 4:
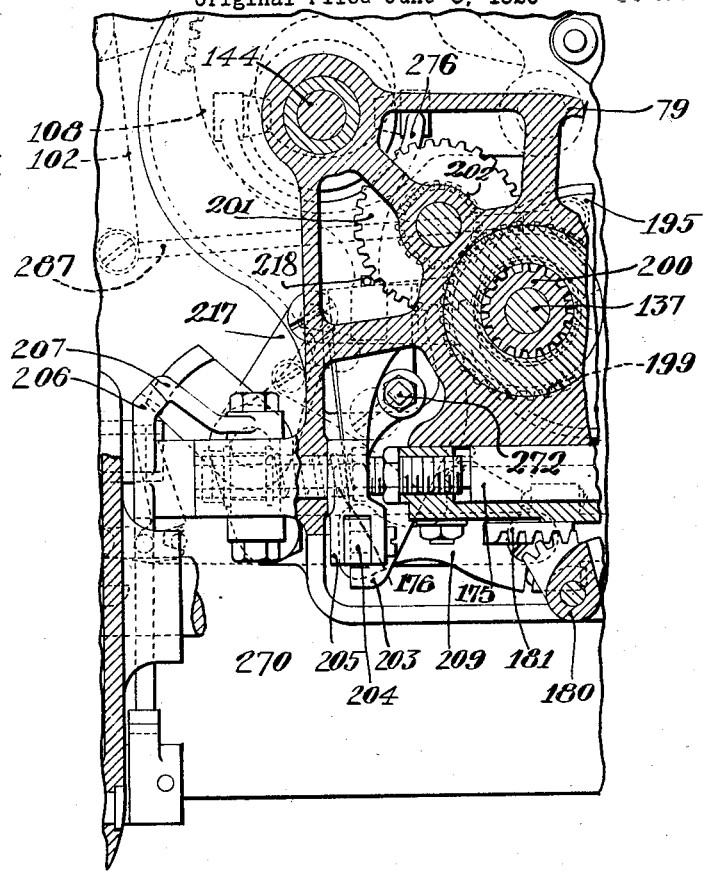
Figure 5:
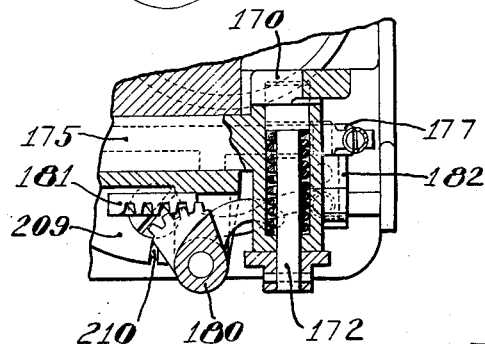
Figure 6:
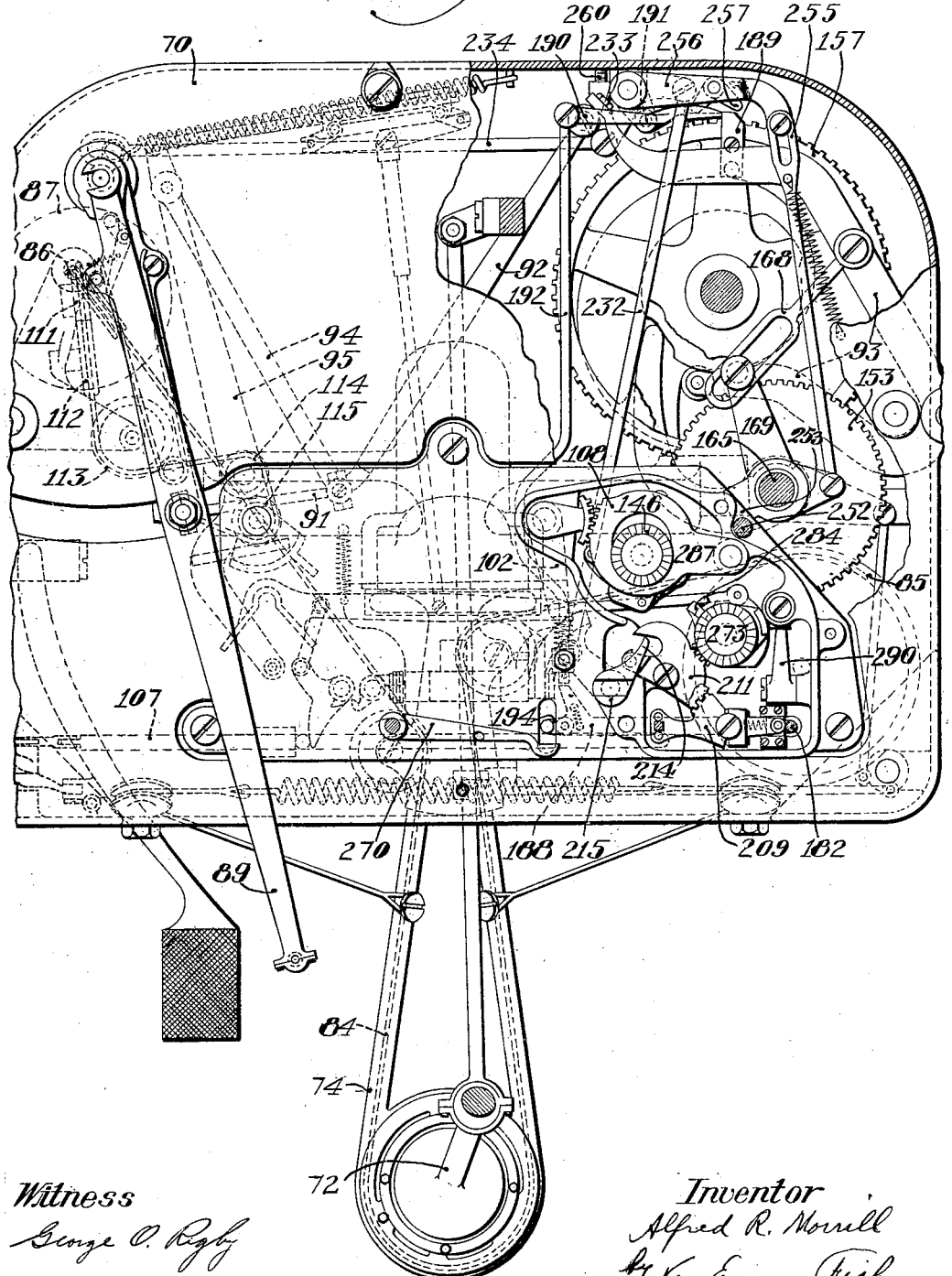

In the drawings, Fig. 1 is a view in front elevation of an automatic welt shoe sewing machine embodying the several features of the present invention, only so much of the machine being illustrated as is necessary to show the connection of the present invention therewith; Fig. 2 is a view in side elevation of the machine with a portion of the frame broken away and looking toward the left of Fig. 1; Fig. 3 is a view in front elevation partly in section of the upper part of the driving and stopping mechanism of the machine; Fig. 4 is a sectional plan view of the portion of the machine illustrated in Fig. 3; Fig. 5 is a detail plan view supplementing the illustration of Fig. 4; Fig. 6 is a plan view of the base portion of the machine with the jack spindle shown in section and a portion of the top plate of the machine base broken away to show underlying parts; Fig. 7 is a plan view of the base portion of the machine with the top plate of the base partly broken away and with a portion of the mechanism shown in section below the plane of Fig. 6; this figure also showing the position of the parts with the jack at the limit of its movement to the left and with the welt cutter in the act of severing the welt; Fig. 8 is a detail plan view of a portion of the mechanism for actuating the jack to pull the welt through the welt guide after the completion of the welt sewing operation; Fig. 9 is a detail sectional plan view showing certain of the parts of the driving and stopping mechanism in the positions they assume during the stopping of the machine in case of the breaking of the thread; Fig. 10 is a detail sectional view of a portion of the driving mechanism; Fig. 11 is a detail sectional view of a portion of the mechanism illustrated in Fig. 10 but looking in the opposite direction; Fig. 12 is a detail sectional view similar to Fig. 11 but taken on a different plane and with the parts in a different position; Fig. 13 is a detail sectional view taken on the line 13—13 of Fig. 11; Fig. 14 is a detail plan view partly in section of a portion of the mechanism through which the pattern cam shaft is driven and showing also a portion of the auxiliary mechanism for driving the cam shaft after the main shaft is thrown out and also a portion of the mechanism for reversely driving the pattern cam shaft when the machine is stopped upon the breakage of thread; Fig. 15 is a detail plan view of certain of the parts illustrated in Fig. 14; Fig. 16 is a detail plan view of certain of the parts illustrated in Fig. 14 but showing the position which they assume during the stopping of the machine at the end of the sewing operation; Fig. 17 is a detail sectional plan view similar to Fig. 14 but taken on a lower plane and showing particularly the mechanism for disconnecting certain of the gears in the main driving train when the pattern cam shaft is rotated by the auxiliary mechanism; Fig. 18 is a sectional elevation taken on the line 18—18 of Fig. 17; Fig. 19 is a detail sectional view taken on the line 19—19 of Fig. 17; Fig. 20 is a detail plan view of certain mechanisms at the upper end of the pattern cam shaft and illustrating particularly the means actuated by the cam shaft for opening the main driving clutch in case the stopping mechanism fails to operate at the completion of the operations performed by the machine; Fig. 21 is a detail sectional view illustrating the means for preventing the closing of the main driving clutch while the levers actuated by the pattern cam shaft are out of engagement with their cams; Fig. 22 is a detail view in side elevation of the lever which opens the main driving clutch; Fig. 23 is a detail sectional view of the upper end of the rock shaft upon which the pattern cam levers are mounted; Fig. 24 is a detail sectional plan view illustrating particularly the construction of one of the levers actuated by the cam shaft; Fig. 25 is a detail view showing in side elevation the mechanism illustrated in Fig. 24 and also the operating handles at the upper end of the pattern cam shaft and the rock shaft upon which the cam levers are mounted; Fig. 26 is a detail sectional plan view illustrating particularly a checking or snubbing device applied to one of the cam levers; Fig. 27 is a horizontal sectional view of the cylinder and piston of the snubbing device; Fig. 28 is a sectional view taken on the line 28—28 of Fig. 26; Fig. 29 is a detail cross sectional view taken on the line 29—29 of Fig. 28; Fig. 30 is a detail sectional plan view illustrating particularly a snubbing device applied to another one of the cam levers associated with the pattern cam shaft, the plane of the figure being indicated by the line 30—30 on Fig. 32; Fig. 31 is a detail sectional view taken on the line 31—31 of Fig. 30; and Fig. 32 is a detail sectional view taken on a plane passing centrally through the cylinder of the snubbing device substantially at right angles to the plane of Fig. 31.

The machine herein disclosed as embodying the present invention comprises sewing mechanism mounted in a sewing head or frame 69 supported upon the base 70 of the machine (see Figs. 1, 2, and 6), a shoe supporting jack comprising a toe supporting arm 71 rigid with a hollow spindle 72 and a heel supporting arm 73 pivoted at its lower end upon the upper end of the spindle 72, a jack supporting structure comprising a horizontal arm 74 in the forward end of which the lower end of the jack spindle is rotatably mounted by means of a gimbal joint, a support 75 upon which the arm 74 is mounted to swing vertically, a frame 76 pivotally mounted at its lower end in the machine base so as to be capable of swinging about a horizontal axis and upon which the support 75 is mounted so as to swing about a substantially vertical axis, a vertical cam shaft 77 mounted in the machine base and carrying a series of cams 78 and a driving and stopping mechanism supported in a frame 79 mounted on the machine base at one side of the frame 69 of the sewing mechanism. The pattern cam shaft 77 makes one complete rotation during a complete cycle of operations of the machine, this cycle consisting of the sewing of the inseam, the severing of the thread and welt at the completion of the sewing, the moving of the jack to the front of the machine away from the sewing devices, and the rotating of the jack in a reverse direction to bring it to its initial position.

During the sewing operation, tipping and rotating movements are imparted to the shoe to maintain the shoe at all times in the proper position with relation to the sewing instrumentalities, tipping movements being imparted by moving the lower end of the jack spindle forwardly and rearwardly of the machine and laterally, and rotating movements being imparted by rotating the jack spindle. For moving the lower end of the jack spindle forwardly and rearwardly, a cam lever 80 is provided, one arm of which is pivotally connected to the frame 76 and the other arm of which is arranged to engage one of the cams 78 on the patern cam shaft. The lateral movements of the lower end of the jack spindle are produced by oscillating the support 75, the lower end of which is provided with a forwardly projecting arm 81 which is connected by means of a link 82 to one arm of a lever 83, the other arm of which is engaged by a cam on the pattern cam shaft. To rotate the jack spindle, a wheel is provided at the lower end of the spindle around which a cord 84 passes. One end of the cord after passing over a pulley near the inner end of the arm 74 is secured to a wheel 85 and the other end of the cord after passing over a pulley near the inner end of the arm 74 and over a pulley 86 on the base of the machine leads to a weight 87. The hub of the wheel 85 is provided with a pinion 850 which meshes with a segmental rack on the outer end of a lever 88, the other end of which lever is engaged by a cam on the pattern cam shaft (Fig. 30).

During the sewing operation the shoe is fed by the feeding devices of the sewing mechanism and also by a feed lever which is actuated from the cam on the pattern cam shaft and which controls the longitudinal position of the shoe in the machine. The feed lever (see Fig. 7) comprising an arm 89 pivotally mounted so as to swing in a horizontal plane, is connected at its forward end by means of a bar 90 to the toe supporting arm of the jack. The feed lever is connected by means of links 91 and 92 to one arm of a lever 93, the other arm of which engages a cam on the pattern cam shaft. The links 91 and 92 are pivotally connected together and to the free end of a swinging guiding link 94. The link 94 is fulcrumed upon a lever 95 which is held locked in position during the operation on a shoe. To adapt the machine for operation on shoes of different sizes, the lever 95 is pivotally mounted upon the machine base so that it can be adjusted to change the position of the fulcrum of the swinging guiding link 94. The fulcrum carrying lever 95 is automatically adjusted at the beginning of the operation in accordance with the size of the shoe, and is held locked in adjusted position in substantially the same manner as in the machine of Patent No. 1,616,714 above referred to.

The construction so far described is substantially the same as that of the machine disclosed in the patent hereinbefore referred to. From an inspection of Figs. 1 and 6, it will be obvious that the action of the cord 84 and weight 87 is to rotate the jack in a reverse direction and to exert a force on the jack supporting structure tending to maintain the cam levers through which the tipping movements are imparted to the jack in contact with their cams. A feature of the present invention is embodied in a structure whereby the cord 84 and weight 87 are also utilized to exert a force on the feeding arm 89 of the jack feeding mechanism and the fulcrum carrying lever 95, tending to keep the cam lever 93 through which the feeding lever is actuated in contact with its cam, and tending to move the fulcrum carrying lever 95 towards one limit of its adjustment. In the construction illustrated, the cord 84 instead of being attached directly to the weight 87 passes around a pulley 111 secured to the weight (see Figs. 1 and 6) and then passes upwardly over a pulley 112 on the machine frame, and then horizontally around a pulley 113, also mounted on the machine frame, then around a pulley 114 mounted on the fulcrum carrying lever 95, then around a pulley 115 mounted on the pivot of the fulcrum carrying lever, and is finally secured to the feed lever.

Another feature of the present invention is embodied in a device or devices for checking or retarding the reverse rotation of the jack and the movements of the levers actuated by the pattern cam shaft under the influence of the weight 87 when the cam levers pass off of the high portions of their cams at the completion of the rotation of the pattern cam shaft. In the construction illustrated in the drawings, a checking or snubbing device is associated with the cam lever 93 from which the feed lever is actuated and with the cam lever 88 through which the wheel 85 is rotated to impart rotating movements to the jack.

The snubbing device associated with the lever 93 (see Figs. 26 to 29 inclusive) comprises a cylinder 116 in which a piston 117 is mounted to reciprocate, the cylinder being pivotally supported at one end on the machine frame and the piston being connected to the lever 93 by means of a connecting rod 118. The cylinder 116 is closed at both ends and is filled with a suitable fluid such as oil. A passageway 119 extends longitudinally through the piston and in order to permit a free flow of the fluid in one direction and to obstruct the flow of fluid in the opposite direction a ball valve 120 is provided in the passageway 119. The piston is thus substantially free to move in one direction, but its movement is retarded in the opposite direction. To regulate this retarded movement, a relief passageway 121 extends longitudinally through the piston 117 and the flow of oil through this passageway is regulated by means of an adjustable pin 122 arranged transversely of the passageway.

The snubbing device for retarding the movements of the wheel 85 and cam lever 88 comprises an oscillating segmental piston 123 mounted to move back and forth in a semi-cylindrical chamber formed in a casing 124 (see Figs. 30, 31 and 32). For convenience of construction, the casing 124 is formed with a cylindrical chamber one-half of which is filled by a stationary semi-cylindrical block 125. The piston 123 projects from a vertical shaft 126, the lower end of which is reduced in size and is journalled in a plug 127 which closes the upper end of the chamber in the casing. To the lower end of the shaft 126 is secured an arm 128 formed at its outer end as a segmental gear which meshes with the pinion 850 on the hub of the wheel 85. The wheel 85 is thus connected to the piston 123 so that the piston is oscillated in the chamber by the forward and backward movement of the wheel. The chamber in the casing 124 is filled with suitable fluid such as oil, and in order to retard the movement of the piston in one direction while permitting it to move with substantial freedom in the opposite direction, the piston is provided with a passageway 129 leading from one side of the piston to the other and with a check ball valve 130 to prevent the flow of liquid in one direction. To provide for a comparatively slow movement of the liquid from one side of the piston to the other, a passageway 131 is formed in the block 125 communicating with the chamber in the casing 124 at opposite sides of the piston. Relief passages 132 and 133 are also provided in the bottom of the casing 124 so that the liquid is allowed to flow freely from one side of the piston to the other when the piston is in certain positions, as for instance, when it is in the positions it assumes at the time the shoe is being operated upon on either side at the junction of the shank and forepart. At these points in the operation on the shoe, a reverse rotation is imparted to the shoe and by reason of these relief passages 132 and 133, these reverse movements are not resisted by the snubbing device. To provide a piston operating mechanism having the requisite amount of strength, the arm 128 which is connected to the piston shaft is made integral with and forms a part of a yoke 134 which straddles the casing 124 and which is provided with a slot engaging a key 135 formed at the upper end of the piston shaft 126.

The illustrated machine, like the machine of Patent No. 1,616,714 hereinbefore referred to, is provided with a driving mechanism from which the sewing mechanism and the pattern cam mechanism are driven, with a stopping mechanism which at the completion of the sewing operation is automatically thrown into operation and which acts to disconnect the sewing and pattern cam mechanism from the driving mechanism, with an auxiliary mechanism normally idle, but which is automatically connected to the driving mechanism when the sewing and the pattern cam mechanisms are disconnected, and with means actuated by the auxiliary mechanism for causing the welt to be severed and the jack to be moved outwardly and reversely rotated to its initial position.

The sewing mechanism and the pattern cam mechanism are driven from a sleeve 136 (see Figs. 1, 2, and 21) mounted loosely on a vertical shaft 137 which is driven continuously from an electric motor through reducing gearing, the last pinion 138 of said gearing meshing with a gear formed on the periphery of a friction clutch member 139 secured to the shaft. The sleeve 136 is provided at its upper end with a friction clutch member 140 cooperating with the clutch member 139. A spiral gear 141 is formed on the sleeve 136 and this gear meshes with a spiral gear 142 secured to the cam shaft of the sewing mechanism. The spiral gear 141 also meshes with a spiral gear 143 secured to the upper end of a vertical shaft 144. This shaft at its lower end is provided with a clutch block 145 (Figs. 10 to 12) connected to the shaft by a key on the block engaging a transverse slot in the lower enlarged end of the shaft. The lower face of the block 145 is provided with teeth to engage correspondingly shaped teeth on the upper surface of the enlarged upper end 146 of a short vertical shaft 147. Surrounding the shaft 147 is a sleeve 148 which is driven from the shaft 147 through a variable speed mechanism and which is provided at its lower end with a pinion 149. From the pinion 149, the pattern cam shaft is driven through a train of gears comprising a gear 150 meshing with the pinion 149, a gear 151 concentric with the gear 150 and secured thereto, a gear 152 meshing with the gear 151 and secured to the lower end of a short vertical shaft 153, an elongated pinion 154 fast on the shaft 153, a gear 155 meshing with the pinion 154, and a series of gears 156 secured together and to the gear 155 arranged to mesh with a gear 157 at the upper end of the pattern cam shaft. The pattern cam shaft is thus driven continuously so long as the members of the main driving clutch 139—140 are engaged, the speed of rotation depending on the adjustment of the variable speed mechanism between the shaft 147 and the sleeve 148. This variable speed mechanism (see Figs. 10 and 14) comprises a ratchet wheel 158 fast on the shaft 147, a series of pawl carriers 159 pivotally mounted on the upper end of the sleeve 148, a pawl 160 mounted on each pawl carrier and spring pressed into engagement with the ratchet 158 and an adjustable cam plate 108 provided with a cam groove engaging pins 161 projecting upwardly from the pawl carriers. The cam plate 108 is adjusted automatically at the start of the operation on a shoe in accordance with the size of the work, substantially as in the machine of Patent No. 1,616,714.

The pattern cam shaft is provided with a series of sets of cams as in the machine of Patent No. 1,616,714, and these cams are brought into cooperative relation with the cam levers by a longitudinal adjustment of the cam shaft and the cams held thereon. The adjustment is made by hand through mechanism which is fully described in said patent.

To hold the cam levers away from the cams while the cam shaft is being adjusted, the shaft 165 upon which the cam levers, with the exception of the lever 93, are mounted, is provided with shouldered collars 166 (see Figs. 21 and 25) which when the shaft 165 is turned by an arm 167 secured to the upper end of the shaft engage the hubs of the levers and move the cam ends of the levers away from the cams. To move the cam lever 93 through which the feed lever is actuated away from its cam, a link 168 is connected to one arm of the lever 93 (see Figs. 6, 20, and 21) and this link has a pin and slot connection with the outer end of an arm 169 secured to the shaft 165.

The stopping mechanism which at the completion of the sewing operation acts to disconnect the sewing mechanism and the pattern cam mechanism from the driving mechanism comprises a bell crank lever 170 (see Figs. 1, 2, 3, and 21) the horizontal arm of which engages a cam groove 171 in the sleeve 136 and the vertical arm of which is provided at its lower end with a hole adapted to receive a locking bolt 172 (see also Figs. 1, 4, and 5). During the sewing operation the sleeve 136 is held in its upward position with the clutch members 140—139 in engagement by means of a spring 173 (see Fig. 21) interposed between the lower end of the sleeve and a flange on a bushing 174 surrounding the shaft 137 and resting on a shoulder on the machine frame. Also during the sewing operation, the locking bolt 172 is held in retracted position so that the bell crank 170 vibrates idly. The locking bolt 172 is mounted in one end of a horizontally movable locking bolt carrier 175 (see Figs. 3, 4, and 5), the other end of which projects beyond the machine frame and is acted upon by a spring 176 which bears against a collar on the carrier and tends to move the carrier towards the left, as viewed in Fig. 3. At the end of the sewing operation, the locking bolt 172 is released and is forced by its spring into the hole in the bell crank lever as soon as the hole in the bell crank is brought into alinement with the locking bolt. This occurs at a predetermined point in the rotation of the sleeve 136 and of the actuating cam shaft of the sewing mechanism and locks the lower end of the vertical arm of the bell crank to the locking bolt carrier. Continued rotation of the sleeve 136 oscillates the bell crank in a direction to move the locking bolt carrier to the right, as viewed in Fig. 3, against the tension of the spring 176. A partial return movement is permitted to the locking bolt carrier and then its return movement to the left is stopped by a spring pressed latch lever 177 (see Fig. 1) a projection on the upper side of which engages a shoulder on the locking bolt carrier. The lower end of the vertical arm of the bell crank is now held stationary and continued rotation of the sleeve 136 moves the sleeve downwardly, thereby disconnecting the clutch members 140—139 and bringing a brake member 178 formed on the lower end of the sleeve 136 into engagement with a fixed brake member 179. This disconnects the sewing mechanism and the pattern cam mechanism from the driving mechanism and stops the sewing mechanism with the actuating cam shaft of the sewing mechanism in a predetermined angular position, in which position the needle is retracted from the work.

The means for holding the locking bolt 172 in retracted position during the sewing operation comprises a horizontally arranged lever 180 (see Fig. 5), one arm of which is forked and engages the inner face of a disc secured to the outer end of the locking bolt, and the other arm of which is provided with a bevel gear segment meshing with a bevel gear segment on the upwardly projecting arm of a lever 181 (see also Figs. 1 and 3). This lever is arranged to swing in a vertical plane and the arm opposite the bevel gear segment is pivotally connected to the upper end of a vertical rod 182. This rod is acted upon by a spring 183 which tends to raise the rod and the rod is provided with a lateral projection 184 (see Figs. 1, 9, 14, 15 and 16), which during the sewing operation is engaged by a spring pressed latch 185. The latch lever 177 which limits the movement of the locking bolt carrier to the left during the operation of the stop mechanism is provided with a slot 186 (see Fig. 1), which is engaged by a pin projecting from the lever 181 so that the latch is withdrawn from engagement with the locking bolt carrier when the rod 182 is depressed.

At the conclusion of the sewing operation the latch 185 (see Figs. 14, 15 and 16) is automatically withdrawn from the projection 184 of the rod 182 so as to set the stop motion into operation. The latch 185 is mounted to slide horizontally in guideways on the machine frame and is provided on its upper surface with a V shaped notch opening towards the rod which is engaged by a pin 187 projecting downwardly from the right hand end of a lever 188. This lever is mounted to swing in a horizontal plane and its movements either forwardly or rearwardly will cause the pin 187 to retract the latch 185, thereby throwing the stop mechanism into operation.

The driving and stopping mechanism so far as described is substantially the same as that of the machine disclosed in Patent No. 1,616,714. In the present machine, however, the mechanism for automatically throwing the stop motion into operation is actuated directly from the pattern cam shaft after it has made nearly a complete revolution. To secure this result, a block 189 is secured to the upper surface of the gear 157 at the upper end of the pattern cam shaft (see Figs. 6, 7, 9 and 20) which block, after the pattern cam shaft has made nearly a complete revolution, engages a lever 190 pivotally mounted at 191 and connected to a rod 192. The forward end of the rod 192 is mounted to slide in a guiding block 193 pivotally mounted on the machine frame and is arranged to engage the end of a dog 194 pivotally mounted at the left hand end of the lever 188. This dog is in the form of a bell crank with one arm normally in position to form in effect a continuation of the rod 192. The dog 194 is interposed between the rod 192 and the lever 188 in order to permit the lever to be moved rearwardly when the machine is stopped on account of a mis-stitch near the end of the sewing operation, as will be hereinafter described. The arrangement of the connections above described is such that as the pattern cam shaft nears the end of a revolution the lever 190 is rocked by the engagement therewith of the block 189, the rod 192 is moved longitudinally towards the front of the machine and the lever 188 is swung forwardly as indicated in Fig. 16 to withdraw the latch 185 and throw the stop mechanism into operation.

The auxiliary mechanism which is normally idle, but which is automatically connected to the driving shaft 137 when the sewing mechanism and the pattern cam mechanism are disconnected therefrom by the action of the stop mechanism, comprises an eccentric 195 (see Figs. 3, 9, 11 and 12) mounted to turn loosely upon a hollow stud 196 formed on the machine frame below and in axial alinement with the shaft 137. Vertically below the eccentric 195 is a clutch block 197 mounted to slide longitudinally on and to rotate with a continuously rotating shaft 198. This shaft is provided with a gear 199 which is driven from a gear 200 at the lower end of the shaft 137 through gears 201 and 202 (see Figs. 3, 4, 10 and 12). The opposed faces of the clutch block 197 and the eccentric 195 are provided with teeth through which the eccentric can be driven from the clutch block whenever the block is raised into engagement with the eccentric. The block 197 is engaged by the forked arm of a lever 203 the arm of which is provided with a projection arranged to be engaged by a projection on the lower end of a rod 204. The upper end of this rod (see Figs. 3 and 4) is connected to an arm 205 on one end of a rock shaft to the other end of which is secured an arm 206 provided with a bevel gear segment meshing with a bevel gear segment on a horizontal arm 207 of a bell crank lever, the vertical arm of which is forked and engages the flanged sleeve at the left hand end of the locking bolt carrier 175. The lower end of the rod 204 (see Figs. 10 to 12 and 14 to 16) is arranged to move vertically between two pins 208 projecting upwardly from a short lever 209 pivoted concentrically with the latch actuating lever 188. The lever 209 is acted upon by two spring pressed plungers 210 mounted in the lever 188 and arranged so that their tendency is to keep the lever 209 in alinement with the lever 188. With this construction, when the lever 188 is swung forwardly to throw the stop mechanism into operation the lever 209 will be retained in its original position by reason of the engagement of the side of the projection on the rod 204 with the projection on the lever 203. As the stop mechanism operates the movement of the locking bolt carrier 175 first to the right, as viewed in Fig. 3, and then to the left, will raise and lower the rod 204, the rod being moved forwardly by the lever 209 as the projection on the rod passes above the projection on the lever 203 during the upward movement of the rod and actuating the lever 203 during its downward movement, as indicated in Fig. 12, to move the clutch block 197 into engagement with the eccentric 195. To permit the clutch block to move away from the eccentric and thus throw the eccentric out of operation, the rod 204 is moved rearwardly to release the lever 203. This takes place after the eccentric has made a complete revolution. To thus move the lever 209 rearwardly, the lever (see Fig. 16) is provided with gear teeth engaged by teeth on one arm of a lever 211. At its other end the lever 211 is provided with a swinging dog 212 adapted to be engaged by a projection 213 on an arm 214 projecting from a rock shaft 215 which is rocked forwardly and backwardly during the rotation of the eccentric, the construction being such that during the forward movement of the arm the projection 213 passes the dog 212 without actuating the lever 211, but during the return movement of the arm the engagement of the projection with the dog actuates the lever 211 to return the lever 209 to its original position and thus move the rod 204 out of engagement with the lever 203.

As has been stated, the mechanism actuated by the eccentric 195 includes a rock shaft 215. This rock shaft is below and in vertical alinement with a rock shaft 216 (see Fig. 3), and is connected thereto by a key and slot so that the two shafts turn in unison. At its upper end the shaft 216 is provided with a laterally extending arm 217 (see Figs. 3 and 9) to which is connected the eccentric strap and link 218 of the eccentric 195. From the shaft 216 the welt severing mechanism is actuated and from the shaft 215 the mechanism is actuated through which the jack is depressed and moved outwardly away from the sewing devices and also the mechanism through which a movement is imparted to the pattern cam shaft to complete its rotation so as to cause the jack to be reversely rotated to its initial position. These mechanisms are substantially the same as the corresponding mechanisms of the machine disclosed in Patent No. 1,616,714 except for a provision in the mechanism for depressing the jack and moving it outwardly of means whereby a dwell in the movement of the jack is produced, after it has been depressed, to facilitate the welt severing operation. In the present machine, also, means are provided, actuated from the shaft 215, for moving the jack at the completion of the sewing operation so as to draw welt through the welt guide and thus permit the welt to be severed between the welt guide and the shoe at a sufficient distance from the end of the same to permit the welt to be butted or properly fitted in the subsequent operations which are performed upon the shoe.

The final movement of the pattern cam shaft is produced through connections between the pattern cam shaft and the arm 222 at the lower end of the rock shaft 215. These connections consist of a rod 232 (see Figs. 6, 9, 14, and 20), the forward end of which is pivotally connected to the arm 222 and the rear end of which is connected to one arm of a bell crank 233 pivotally mounted on the machine frame, the other arm of which bell crank carries the pivot 191 for the lever 190. As has been described, the lever 190 is actuated by the block 189 on the gear 157 to throw the stop mechanism into operation at the completion of the sewing operation. As the rotation of the pattern cam shaft ceases, the lever 190 remains resting upon the block 189 and remains in this position until the eccentric 195 is thrown into operation. During the forward swinging movement of the arm 222 the bell crank 233 is rocked in a direction to move the lever 190 bodily so that it drops behind the block 189. As the arm 222 swings back to its original position during the latter part of the rotation of the eccentric 195, the lever 190 acts as a pawl to cooperate with the block 189 to turn the cam shaft a sufficient distance to complete its revolution. As the cam shaft completes its revolution, the cam levers which engage the cams are permitted to move towards the center of the shaft and thus the jack is reversely rotated and the other parts of the machine connected to the cam levers are returned to their starting position.

A feature of the present invention is embodied in means for opening the main driving clutch and thereby stopping the machine and preventing injury to the various parts of the machine or to the shoe in case the stop mechanism fails to operate. In the construction illustrated, this result is secured by the provision of a series of connections which operate to open the main driving clutch in case the lifting of the lever 190 by the block 189 fails to cause an operation of the stop mechanism. These connections include a pivotally mounted lever or frame 250 (see Figs. 2, 20, 21 and 22) provided with a roll 251 for engaging the upper surface of the brake member 178 on the sleeve 136. This lever is connected to a vertical actuating rod 252, the lower end of which is provided with a slot arranged to be engaged by a cam projection 253 on a collar 254 loosely mounted upon the hub of the arm 169 secured to the shaft 165 upon which the cam levers, with the exception of the lever 93 which are actuated from the pattern cam shaft, are mounted. The collar 254 is connected by a rod 255 to a frame 256 pivotally mounted on the same pivot shaft with the bell crank lever 233. In the frame 256 a plate 257 is pivotally mounted in position to be engaged by the block 189 on the gear 157 and this plate is provided with an extension 258 overlying the forward end of the lever 190. A spring 259 acts on the rod 255 and through the rod on the frame 256 to hold the right hand end of the frame as viewed in Fig. 20 depressed with a stop screw 260 on the left hand end of the frame in contact with the frame of the machine. Fig. 20 illustrates the position which the parts assume in breaking the main clutch in case the stop mechanism fails to operate. As indicated in this figure, the block 189 has lifted the lever 190 but the lever has not been moved to the left so as to slide off of the block to the position indicated in Fig. 6. Also, as indicated in Fig. 20, the plate 257 has been raised by the block 189, the projection 258 has been brought into contact with the forward end of the lever 190 which is supported on the block 189, and the frame 256 has been raised. The raising of the frame 256 has rotated the collar 254 and through the cam projections 253 and rod 252 has operated the lever 250 to force the sleeve 136 downwardly and disengage the members 140—139 of the main driving clutch.

Another feature of the present invention is embodied in a means for preventing the closing of the main clutch so long as the levers actuated from the pattern cam shaft are in their retracted positions out of engagement with their cams. In the construction illustrated, this result is secured by the rotation of the collar 254 and the depression of the sleeve 136 through the rod 252 and lever 250, when the rock shaft 165 is actuated by the arm 167 to withdraw the cam levers from the cams. To cause the collar 254 to be rotated from the shaft 165 it is provided with a shoulder arranged to be engaged by a shoulder on the hub of the arm 169 which is secured to the shaft 165. To permit the collar 254 to be thus actuated without moving the frame 256, the rod 255 is connected to the frame by a pin and slot, as clearly shown in Fig. 20.

In the machine illustrated in the drawings, a series of pattern cams is provided from which a mechanism for slashing the welt during the sewing operation is controlled. These cams are conveniently arranged to alternate on the pattern cam shaft with the cams which are used to actuate the jack feeding lever. One of the jack feeding cams and one of the cams for controlling the welt slashing mechanism are shown in Fig. 24. It will be apparent from this figure that the lever 261 which cooperates with the cam for controlling the operation of the welt slashing mechanism must be moved through a wide arc to clear the other cams on the cam shaft when the shaft is adjusted vertically.

A feature of the present invention is embodied in a construction by which the lever 261 can be moved through a wider arc than the other cam levers mounted on the shaft 165, but the same angular movement of the shaft 165 can be utilized to retract all of the levers mounted on this shaft. In the construction illustrated, the lever 261 (see Figs. 20, 24, and 25) is loosely mounted on the shaft 165 and is connected by toggle levers 262—263 with a rock shaft 264 mounted in an arm 265 projecting from a hub 266 also mounted on the shaft 165. With this construction, when the toggle levers are in alinement, as illustrated in Fig. 20, the lever 261 is rigidly connected with and in effect forms one part with the arm 265 and hub 266. By turning the rock shaft 264, however, the toggle levers can be moved out of alinement as illustrated in Fig. 24 and the lever 261 swung through a wide arc about the shaft 165 independently of the hub 266. In the construction shown, the rock shaft is so swung by a sleeve 267 mounted on the shaft 165 and provided with a gear segment 268 meshing with a gear segment 269 on the lower end of the rock shaft 264, shoulders being provided on the sleeve 267 and on one of the sleeves 166 secured to the shaft 165 for rotating the sleeve 267 when the shaft 165 is operated by the arm 167.

The illustrated machine is provided with mechanism operating, upon the occurrence of a mis-stitch caused by breakage or looseness of the thread, to stop the sewing mechanism and the pattern cam mechanism without throwing the auxiliary mechanism into operation, this stopping mechanism being similar in some respects to that of the machine of Patent No. 1,616,714. The illustrated machine is also provided with mechanism somewhat similar to that of Patent No. 1,616,714 thrown into operation when the sewing mechanism and pattern cam mechanism are stopped on account of the occurrence of a mis-stitch, and acting to turn the pattern cam shaft backwards a predetermined amount. In the construction illustrated (see Fig. 9) this stopping mechanism includes a lever 270 which is actuated upon the occurrence of a mis-stitch to move the lever 188 rearwardly as indicated in Figs. 9 and 15. The movement of the lever 188 to the rear, as indicated in Figs. 9 and 14 withdraws the latch 185 from the rod 182 and sets the stop mechanism into operation in the manner hereinafter described. It will be noted, however, that as the rod 204 rises (see Fig. 11) its lower end will be moved to the right, as viewed in Fig. 11 or to the rear as viewed in Fig. 9 so that upon the downward movement of the rod a shoulder at the lower end of the rod will engage a lever 271 instead of the lever 203. The lever 271 is provided with a set screw 272 (see Figs. 10 and 11) which as the lever 271 is depressed engages the lever 203 back of its pivot and thus depresses the clutch block 197 instead of raising it. The lower end of the clutch block 197 is provided with teeth to engage similar teeth at the upper end of a short vertical shaft 273 so that so long as the block 197 remains depressed, the shaft 273 will be driven from the shaft 198, which as has been hereinbefore stated, is continuously driven from the main driving shaft 137. At its lower end the shaft 273 is provided with a gear 274 meshing with a gear 275 concentric with and secured to the gears 150—151 forming part of the gear train through which the pattern cam shaft is driven. The construction is such that the rotation of the shaft 273 in the manner described, imparts a reverse rotation to the pattern cam shaft. To prevent a reverse rotation of the cam shaft of the sewing mechanism when the pattern cam shaft is thus driven backwardly, a lever 276 is provided (see Figs. 9 and 10 to 13 inclusive) which lever is pivotally mounted on the pivot stud of the lever 271 and engages at its forked rear end with a groove in the clutch block 145 at the lower end of the shaft 144. The lever 276 is provided with a projection 277 arranged to be engaged by a projection 278 on the lever 271 so that the lever 276 is actuated when the lever 271 is depressed and raises the clutch block 145 out of engagement with the clutch 146 against the tension of the springs 279. A spring plunger 280 mounted in the lever 276 and bearing against a portion of the lever 271 normally maintains the projections 277 and 278 in contact, but permits an upward independent movement of the lever 271 when the lever 203 is depressed as has been hereinbefore described, to raise the clutch block 197.

After the cam shaft has been driven backwardly, the desired distance, the lever 271 is released and the clutch block 197 is raised to disconnect the pattern cam shaft from the reverse driving mechanism. The release of the lever 271 is effected by moving the lower end of the rod 204 out of engagement with the lever. The rod is moved by the levers 209 and 211 hereinbefore described, the lever 211 being provided with a series of gear teeth 281 meshing with a corresponding series on a disc 282 which after a partial rotation of the shaft 198 is rotated by the shaft to actuate the levers 211 and 209 (see Fig. 14). The disc 282 is actuated from the shaft 273 through a ring 283 surrounding the shaft and adapted to be driven therefrom in one direction by a ball clutch, but permitting an independent rotation of the shaft in the opposite direction. The shaft 273 is geared to the pattern cam shaft as has been described and during the normal operation of the machine the shaft 273 rotates in a clockwise direction. Its rotation in this direction moves the ring 283 frictionally until its movement is stopped by the engagement of a radial projection 284 with a projection 285 on the flange of a sleeve 286 surrounding the shaft 273. The sleeve 286 is connected by a rod 287 to the arm 102 of the speed changing mechanism hereinbefore described so that the position of the projection 285 and consequently the initial angular position of the ring 283 is varied with the size of the shoe being operated upon. The normal position of the ring 283 is indicated in Fig. 14. When the reverse driving mechanism is thrown into operation the ring is driven by the shaft 273 which is rotating in a counterclockwise direction until the radial lug 284 engages an upwardly extending cam projection 288 on the disc 282. Continued rotation of the ring actuates the disc 282 to move the levers 211—209 as has hereinbefore been described, and at the same time the cam projection 288 engages a projection on the lever 203 (see Fig. 11) and positively disengages the clutch block 197 from the shaft 273.

A mis-stitch may occur near the end of the seam and after the block 189 of the stopping mechanism has moved beneath the lever 190. The provision of the dog 194 hereinbefore described, however, between the lever 188 and the rod 192 permits the mis-stitch stop mechanism to operate at this time, the dog being arranged so that during the movement of the lever 270 the dog is first swung out of engagement with the rod 192 and then forms a rigid connection between the lever 188 and the lever 270.

A mis-stitch also sometimes occurs at the beginning of a seam and in order to avoid injury to the machine by a reverse rotation of the pattern cam shaft beyond its initial starting position, a feature of the present invention is embodied in devices for throwing out the reverse driving mechanism when the pattern cam shaft is returned to starting position. In the construction illustrated (see Figs. 9 and 14) the lever 211 is provided with a projection 289 which when the reverse driving mechanism is thrown into operation extends over the projection 213 on the arm 214 of the shaft 215. When the pattern cam shaft is in its initial position, the relative positions of the block 189 and lever 190 are as indicated in Fig. 9 in which figure it will be seen that the forward end of the lever 190 rests behind the block. In case of a mis-stitch at the beginning of the seam, a backward rotation of the pattern cam shaft will bring the block 189 into contact with the lever 190 and force it backwardly, thereby rocking the bell crank 233 and through the rod 232 and arm 222 rocking the shaft 215 and moving the arm 214 in a direction to cause the projection 213 on the arm to actuate the lever 211 to the same extent that it would be actuated by the disc 282 if a mis-stitch occurred elsewhere in the seam.

On account of the number of gears in the trains through which the pattern cam shaft is driven both forwardly and backwardly considerable strain is brought upon the auxiliary mechanism in completing the rotation of the pattern cam shaft. A feature of the present invention is embodied in a construction for lessening this strain, means being provided in the illustrated machine for moving the shaft 153 axially (see Figs. 17, 18 and 19) to throw the gears 151 and 152 out of mesh prior to the final actuating of the pattern cam shaft to thereby disconnect from the pattern cam shaft a number of the gears composing the direct and reverse drives. For axially moving the shaft 153, a bell crank lever 290 is provided, the horizontal arm of which has a gear tooth and rack engagement with a sleeve 291 on the shaft and the vertical arm of which engages an inclined slot 292 in a slide 293. A cam 294 on the hub of the arm 222 at the lower end of the shaft 215 is arranged to move the slide 293 in a direction to cause the shaft 153 to be depressed so as to move the gear 152 out of mesh with the gear 151. The shaft 153 is raised to return the gear 152 into mesh with the gear 151 by a lever 295, one end of which engages a roll 296 on the slide 293 and the other end of which engages a shoulder on the treadle actuated rod 107.

The nature and scope of the present invention having been indicated and an embodiment of the several features of the invention having been specifically described, what is claimed is:

1. A machine for operating on shoes having, in combination, a shoe supporting jack, means for operating on a shoe, a pattern cam shaft, mechanism actuated by the cam shaft for changing the relative positions of the jack and operating means during the operation on a shoe, a main clutch through which the cam shaft and the operating means are driven, a stop mechanism acting when thrown into operation to stop the operating means, and means actuated by the cam shaft for opening the main clutch in case the stop mechanism fails to operate.

2. A machine for operating on shoes having, in combination, a shoe supporting jack, means for operating on a shoe, a pattern cam shaft, mechanism actuated by the cam shaft for changing the relative positions of the jack and operating means during the operation on a shoe, a clutch through which the cam shaft and the operating means are driven, a stop mechanism acting when thrown into operation to stop the operating means, means actuated by the cam shaft for throwing the stop mechanism into operation, and means actuated by the cam shaft for opening the main clutch in case the stop mechanism fails to operate.

3. A machine for operating on shoes having, in combination, a shoe supporting jack, means for operating on a shoe, a pattern cam shaft, mechanism actuated by the cam shaft for changing the relative positions of the jack and operating means during the operation on a shoe, a clutch through which the cam shaft and the operating means are driven, a stop mechanism acting when thrown into operation to open the main clutch and stop the operating means, auxiliary mechanism thrown into operation by the stop mechanism for driving the cam shaft, and means controlled by the auxiliary mechanism and actuated by the cam shaft for opening the main clutch in case the stop mechanism fails to operate.

4. A machine for operating on shoes having, in combination, a shoe supporting jack, means for operating on a shoe, a pattern cam shaft, mechanism actuated by the cam shaft for changing the relative positions of the jack and operating means during the operation on a shoe, a main clutch and a main gear train for driving the cam shaft and operating means, an auxiliary clutch and suitable connections for driving the cam shaft, means for opening the main clutch and closing the auxiliary clutch at the completion of an operation on the shoe, and means for disconnecting the main gear train from the cam shaft when the auxiliary clutch is closed.

5. A machine for operating on shoes having, in combination, a shoe supporting jack, means for operating on a shoe, a pattern cam shaft, mechanism actuated by the cam shaft for changing the relative positions of the jack and operating means during the operation on a shoe, a main clutch and a main gear train for driving the cam shaft and operating means, an auxiliary clutch and suitable connections for driving the cam shaft, a backing up clutch and reverse gear train for driving the cam shaft, means for opening the main clutch and closing the auxiliary clutch at the completion of an operation on the shoe, and means for disconnecting the main and reverse gear trains from the cam shaft when the auxiliary clutch is closed.

6. A machine for operating on shoes having, in combination, a shoe supporting jack, means for operating on a shoe, mechanism for changing the relative positions of the jack and operating means during the operation on a shoe comprising a cam shaft, cams on the shaft, cam levers engaged by the cams, means for moving the cam levers out of engagement with their cams, a clutch through which the cam shaft is driven, and means preventing closure of the clutch until the cam levers are returned into engagement with their cams.

7. A machine for operating on shoes having, in combination, a shoe supporting jack, means for operating on a shoe, mechanism for changing the relative positions of the jack and operating means during the operation on a shoe comprising a cam shaft, cams on the shaft, cam levers engaged by the cams, mechanism for moving the cam levers out of engagement with their cams, a clutch through which the cam shaft is driven, and means actuated by said last mentioned mechanism for preventing closure of the clutch.

8. A machine for operating on shoes having, in combination, a shoe supporting jack, means for operating on a shoe, a pattern cam shaft, mechanism actuated by the cam shaft for changing the relative positions of the jack and operating means during the operation on a shoe, a cam on said shaft, a cam lever engaged by the cam, connections actuated by the lever, and means for moving the lever independently of said connections out of engagement with the cam.

9. A machine for operating on shoes having, in combination, means for operating on a shoe and a shoe supporting jack relatively movable to transfer the point of operation along a shoe, a pattern cam shaft from which the jack and operating means are actuated and controlled during the operation on a shoe, cams on the shaft, cam levers engaged by the cams, connections actuated by the levers, and means for moving the levers out of engagement with the cams arranged to move one lever through a greater angular distance independently of its connections.

10. A machine for operating on shoes having, in combination, a shoe supporting jack, means for operating on a shoe, mechanism for changing the relative positions of the jack and operating means during the operation on a shoe comprising a cam shaft, face cams on the shaft, cam levers engaged by the cams, yielding means for moving the levers towards the axis of the cams, and snubbing devices to retard the cam levers.

11. A machine for operating on shoes having, in combination, means for operating on a shoe, a horizontally movable support, a shoe supporting jack mounted thereon, a cam shaft, a member actuated from the cam shaft, a pulley connected to the jack, guiding pulleys, a cord connected to said member and passing over said pulleys, a weight arranged to act through the cord on said member in opposition to the cam shaft, and a snubbing device connected to said member for retarding its movement under the force of the weight.

12. A machine for operating on shoes having, in combination, a shoe supporting jack, means for operating on a shoe, mechanism for changing the relative positions of the jack and operating means during the operation on a shoe comprising a cam shaft, face cams on the shaft, cam levers, a cord connected to said levers, a weight engaging the cord intermediate its ends and arranged to act through the portions of the cord on both sides of the weight to move the levers towards the axis of the cam shaft, and snubbing devices to retard the action of both portions of the cord.

13. A machine for operating on shoes having, in combination, means for operating on a shoe, a horizontally movable support, a shoe supporting jack mounted thereon, a cam shaft, a member actuated from the cam shaft, a pulley connected to the jack, guiding pulleys, a feed lever, connections between the pattern cam and feed lever, and a weighted cord passing over said pulleys and arranged to act on said member and lever in opposition to the cam shaft.

14. A machine for operating on shoes having, in combination, means for operating on a shoe, a horizontally movable support, a shoe supporting jack mounted thereon, a cam shaft, a member actuated from the cam shaft, a pulley connected to the jack, guiding pulleys, a feed lever, connections between the pattern cam and feed lever adjustable for operation with shoes of different sizes, and a weighted cord passing over said pulleys and arranged to act on said member and lever in opposition to the cam shaft and to act on said connections in a direction tending to shift the adjustment towards one of its limits.

15. A machine for operating on shoes having, in combination, means for operating on a shoe, a horizontally movable support, a shoe supporting jack mounted thereon, a cam shaft, a member actuated from the cam shaft, a pulley connected to the jack, guiding pulleys, a weighted cord passing over said pulleys and arranged to act on said member in opposition to the cam shaft, and a snubbing device for retarding the movement of said member under the force of said weighted cord comprising an oscillatory piston connected to move with said member, and means for retarding the movement of the piston in one direction.

16. A machine for operating on shoes having, in combination, means for operating on a shoe, a horizontally movable support, a shoe supporting jack mounted thereon, a cam shaft, a member actuated from the cam shaft, a pulley connected to the jack to rotate therewith, guiding pulleys, a weighted cord passing over said pulleys and arranged to act on said member in opposition to the cam shaft, and a snubbing device for retarding the movement of said member under the force of said weighted cord comprising an oscillatory piston connected to move with said member, a fluid-containing chamber shaped to cooperate with said piston, means for retarding the flow of liquid from one side of the piston to the other in one direction, and relief passages to permit flow of liquid from one side of the piston to the other at certain angular positions of the piston.

17. A machine for operating on shoes having, in combination, a shoe supporting jack, means for operating on a shoe, a pattern cam shaft rotating in one direction during the normal operation of the machine, mechanism actuated by the cam shaft for changing the relative positions of the jack and operating means during the operation on a shoe, means operating upon a failure of said operating means to impart a reverse movement to the pattern cam shaft, and means actuated from the cam shaft for stopping such reverse movement.

18. A machine for operating on shoes having, in combination, a shoe supporting jack, means for operating on a shoe, a pattern cam shaft rotating in one direction during the normal operation of the machine, mechanism actuated by the cam shaft for changing the relative positions of the jack and operating means during the operation on a shoe, means operating upon a failure of said operating means to impart a reverse movement to the pattern cam shaft, and means for stopping the reverse movement of the cam shaft in case it reaches its initial starting position during such reverse movement.

19. A machine for operating on shoes having, in combination, a shoe supporting jack, means for operating on a shoe, a pattern cam shaft rotating in one direction during the normal operation of the machine, mechanism actuated by the cam shaft for changing the relative positions of the jack and operating means during the operation on a shoe, means operating upon a failure of said operating means to impart a reverse movement to the pattern cam shaft, and means actuated by the cam shaft as it reaches its initial starting position for stopping such reverse movement.

20. A machine for operating on shoes having, in combination, a shoe supporting jack, means for operating on a shoe, a pattern cam shaft rotating in one direction during the normal operation of the machine, mechanism actuated by the cam shaft for changing the relative positions of the jack and operating means during the operation on a shoe, reverse driving mechanism for the cam shaft including a clutch, means operating upon a failure of said operating means to close said clutch, means operated by the reverse driving mechanism for opening said clutch after a predetermined reverse movement of the cam shaft, and means operated by the cam shaft as it reaches its initial starting position to open said clutch.

21. A machine for operating on shoes having, in combination, a shoe supporting jack, means for operating on a shoe, a pattern cam shaft rotating in one direction during the normal operation of the machine, mechanism actuated by the cam shaft for changing the relative positions of the jack and operating means during the operation on a shoe, reverse driving mechanism for the cam shaft including a clutch, means operating upon a failure of said operating means to close said clutch, a latch to hold said clutch closed, a member acting when actuated to release the latch and open the clutch, means for actuating said member from the reverse driving mechanism after a predetermined reverse movement of the cam shaft, and means for actuating said member from the cam shaft as said shaft reaches its initial starting position.

22. A machine for operating on shoes having, in combination, a shoe supporting jack, means for operating on a shoe, a pattern cam shaft rotating in one direction during the normal operation of the machine, mechanism actuated by the cam shaft for changing the relative positions of the jack and operating means during the operation on a shoe, connections actuated from the cam shaft at the completion of an operation on the shoe to stop the cam shaft, and means operated upon a failure of said operating means to break said connections and impart a reverse movement to the cam shaft.

In testimony whereof I have signed my name to this specification.

ALFRED R. MORRILL.